(12) United States Patent
Lambrecht (10) Patent No.: US 9,587,858 B2
(45) Date of Patent: Mar. 7, 2017

(54) SOLAR COLLECTOR (71) Applicant: Richard M. Lambrecht, Milwaukee, WI (US)

(72) Inventor: Richard M. Lambrecht, Milwaukee, WI (US)

( * ) Notice: Subject to any disclaimer, the term of this patent is extended or adjusted under 35 U.S.C. 154(b) by 296 days.

(21) Appl. No.: 14/216,557

(22) Filed: Mar. 17, 2014

(65) Prior Publication Data

US 2014/0261392 A1     Sep. 18, 2014

Related U.S. Application Data (60) Provisional application No. 61/794,102, filed on Mar. 15, 2013.

(51) Int. Cl.
| F24J 2/12 | (2006.01) |
| F24J 2/08 | (2006.01) |
| F24J 2/14 | (2006.01) |
| F24J 2/54 | (2006.01) |

(52) U.S. Cl.
CPC . *F24J 2/08* (2013.01); *F24J 2/14* (2013.01); *F24J 2/5424* (2013.01); *Y02E 10/45* (2013.01); *Y02E 10/47* (2013.01)

(58) Field of Classification Search
CPC .. F24J 2/38; F24J 2/10; F24J 2/08; F24J 2/12
USPC .................. 126/714, 683, 573, 600; 136/247
See application file for complete search history.

(56) References Cited

U.S. PATENT DOCUMENTS

| 4,249,516 A | * | 2/1981 | Stark | F24J 2/067 |
| | | | | 126/601 |
| 4,284,839 A | * | 8/1981 | Johnson | F24J 2/06 |
| | | | | 126/573 |
| 4,433,199 A | * | 2/1984 | Middy | F24J 2/06 |
| | | | | 136/246 |
| 2009/0056704 A1 | * | 3/2009 | Donati | C23C 18/1208 |
| | | | | 126/694 |
| 2010/0037953 A1 | * | 2/2010 | Xie | F24J 2/07 |
| | | | | 136/259 |
| 2011/0079271 A1 | * | 4/2011 | Dets | H01L 31/055 |
| | | | | 136/247 |
| 2011/0114078 A1 | * | 5/2011 | Fargo | F24J 2/08 |
| | | | | 126/573 |

* cited by examiner

*Primary Examiner* — Gregory Huson
*Assistant Examiner* — Nikhil Mashruwala
(74) *Attorney, Agent, or Firm* — Ryan Kromholz & Manion, S.C.

(57) ABSTRACT

A solar collector apparatus includes a parabolic mirror configured to direct solar energy through a double convex lens and towards a linear set of secondary mirrors, each of the secondary mirrors positioned to direct the solar energy towards a solar collection target. The subsequent diversion achieved by the solar collector apparatus allows collection of solar energy several times denser than natural sunlight, and can be captured using a substantially compact system.

20 Claims, 9 Drawing Sheets

SOLAR COLLECTOR

RELATED APPLICATIONS

This application claims the benefit of U.S. Provisional Patent Application Ser. No. 61/794,102, filed 15 Mar. 2013, and entitled "Solar Collector."

BACKGROUND OF THE INVENTION

The present invention relates generally to solar energy collecting devices, and more particularly to a solar reflector system for maximizing concentrated solar energy by directing solar energy to a solar collection target.

Solar energy collecting devices have been used for residential and commercial heating and energy production. However, current collecting devices utilize only single axis tracking of the solar path, or provide no solar tracking, therefore resulting in rather inefficient operation throughout the day and the year. Furthermore, many current solar collecting devices make use of a system that creates only a single diversion, and therefore concentrates a limited amount of solar energy to a single point. Finally, solar collector systems used to collect large quantities of solar energy can be extremely large.

There remains a need for a reasonably-sized, double axis-tracking solar collector system that utilizes multiple diversions to collect large amounts of solar energy at a single solar collection target.

SUMMARY OF THE INVENTION

The present invention satisfies this need by providing at least one primary parabolic mirror configured to direct solar energy through a double convex lens and towards a linear set of secondary mirrors, each of the secondary mirrors positioned to direct the solar energy towards a solar collection target.

A system according to the present invention includes a parabolic mirror extending longitudinally along and straddling a central plane. The parabolic mirror is configured to direct received sunlight towards a focal line contained within the central plane. A lens (e.g. a double convex lens, or one or more plano-convex rectangular cylinder lenses) is positioned along the focal line configured to receive reflected sunlight from the parabolic mirror. At least one secondary mirror (e.g. planar, paraboloid, or parabolic mirror) is adapted to receive directed sunlight from the lens and to reflect the directed sunlight at a target, which may be positioned inside our outside the length of the parabolic mirror.

According to an aspect of a system according to the present invention, the parabolic mirror and lens are preferably positionally fixed with respect to each other. The secondary mirrors are selectively stationarily positionable with respect to the parabolic mirror and/or lens.

According to another aspect of a system according to the present invention, a tracking system may be coupled to the parabolic mirror so as to allow the central plane to be generally aimed at the sun throughout the day.

A method according to the present invention includes the steps of reflecting sunlight from a parabolic mirror towards a lens (e.g. a double convex lens or one or more plano-convex rectangular cylindrical lenses), which then directs the sunlight towards a reflective surface (which may be planar or a paraboloid) having a first reflective area. The sunlight is focused on a target surface area, wherein the target surface area is smaller than the first reflective area.

According to one aspect of a method according to the present invention, the method may further include the step of rotating the parabolic mirror along a first plane of rotation and/or the step of rotating the parabolic mirror along a second plane of rotation (which may be perpendicular to the first). These rotations may be carried out consecutively or partially or completely simultaneously.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
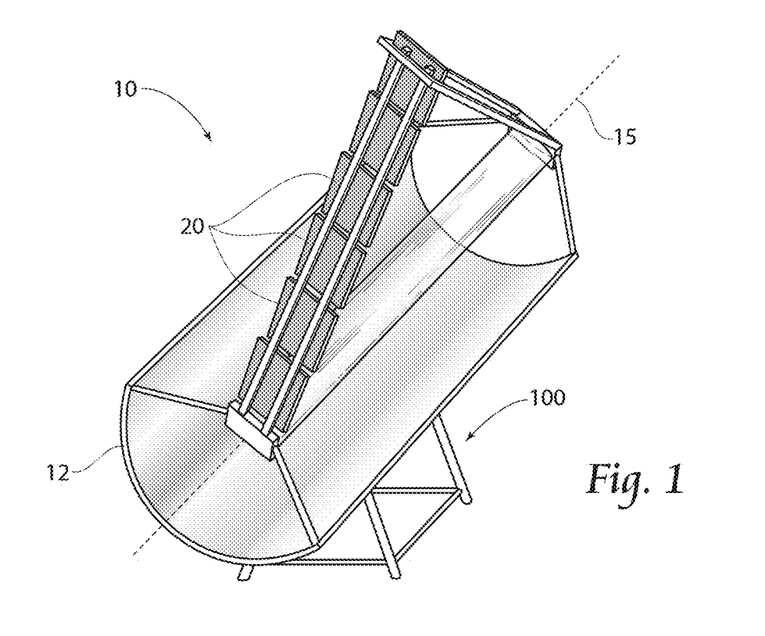
FIG. 1 is a perspective view of a first embodiment of a solar collector apparatus according to the present invention.
Figure 2:
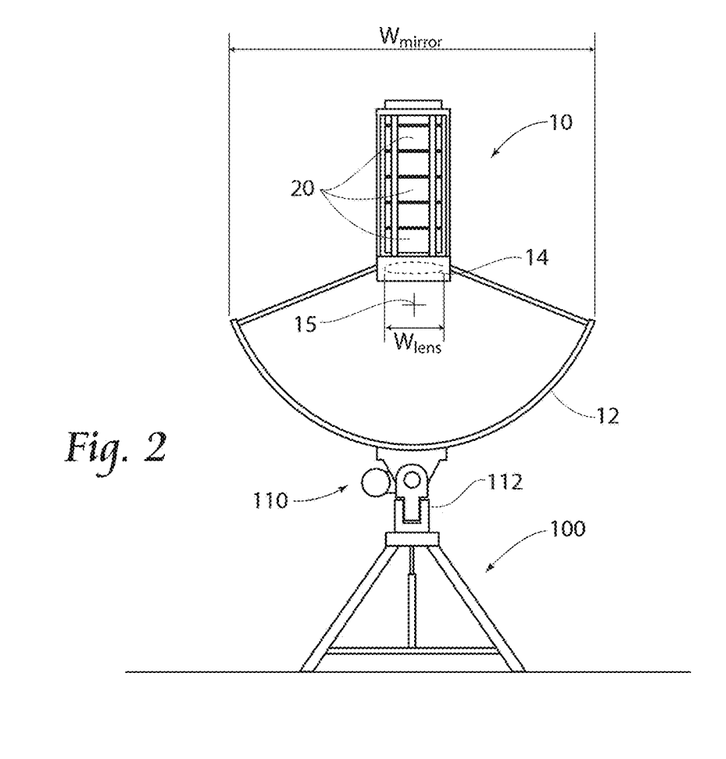
FIG. 2 is an end view of the solar collector apparatus shown in FIG. 1.
Figure 3:
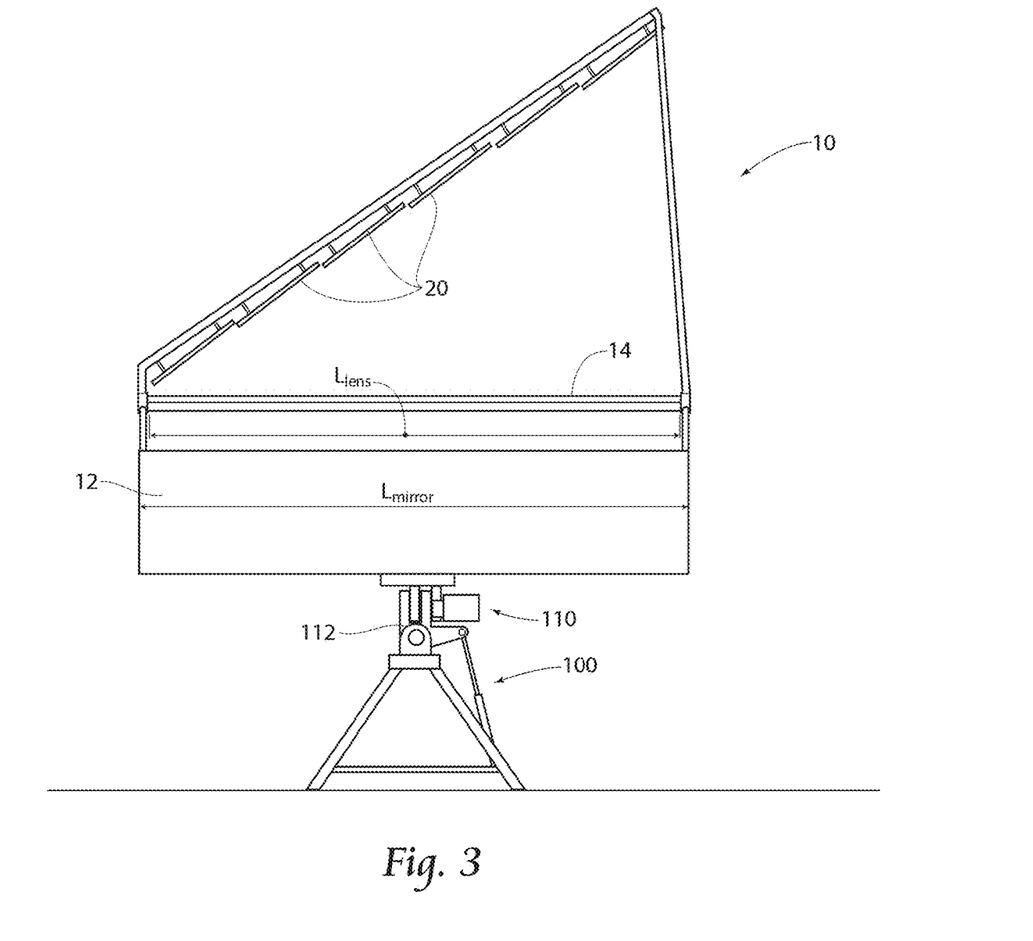
FIG. 3 is a side view of the solar collector apparatus shown in FIG. 1.

FIGS. 1-3 depict a solar collector 10 according to the present invention. As shown, the solar collector 10 has a parabolic mirror 12, a double convex lens 14, and a plurality of secondary mirrors 20. The solar collector 10 is held on a base 100 that may utilize a solar tracking system 110. Various embodiments of the solar tracking system 110 may be utilized with the solar collector 10 of the present invention.

The parabolic mirror 10 is situated in order to receive solar energy and direct it towards a double convex lens 14 that is positioned along a central axis 15 of the parabolic mirror 10. The parabolic mirror 10 may be constructed any length and width necessary to collect the desired amount of solar energy. In a preferred embodiment, the parabolic mirror 10 is 5 feet in length $L_{Mirror}$ and has a width $W_{Mirror}$ of approximately 6 feet. In a preferred embodiment, the double convex lens 14 has a width $W_{Lens}$ of 1 foot and thereby collects solar energy that is directed to the parabolic mirror 10 that is on each side of the lens 14. In an alternative preferred embodiment, the lens 14 has a width $W_{Lens}$ of 4-6 inches.

Figure 4:
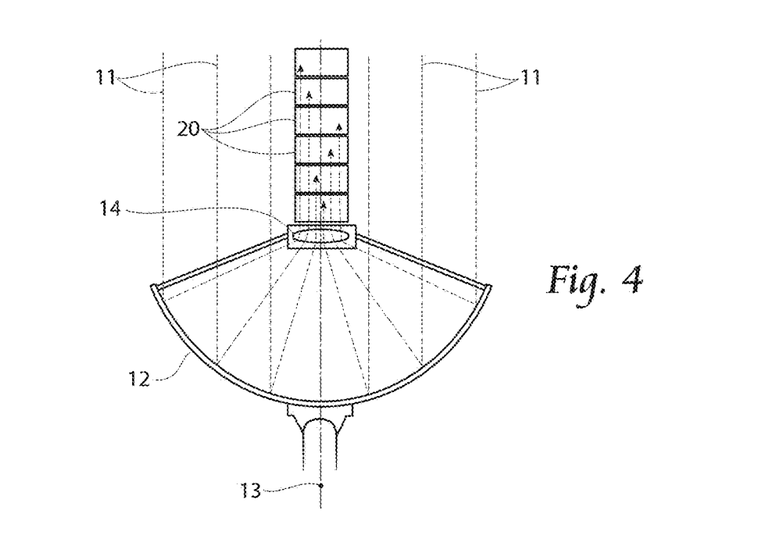
FIG. 4 is an end view of the solar collector apparatus shown in FIG. 1, showing solar energy ray tracing.
Figure 5:
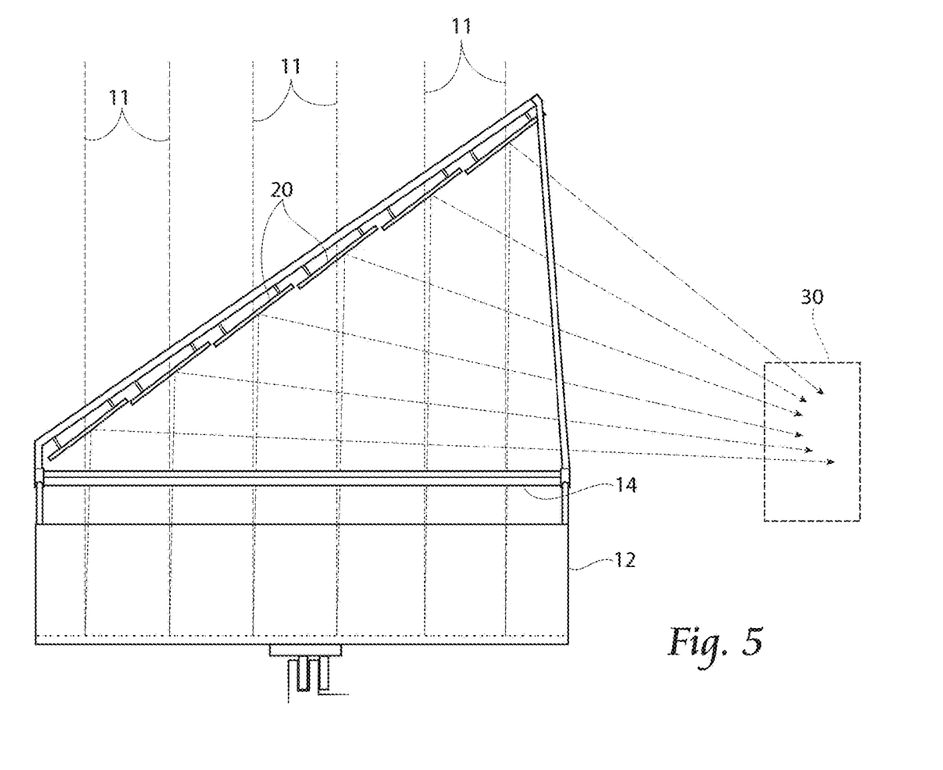
FIG. 5 is an end view of the solar collector apparatus shown in FIG. 1, showing solar energy ray tracing.
Figure 6A:
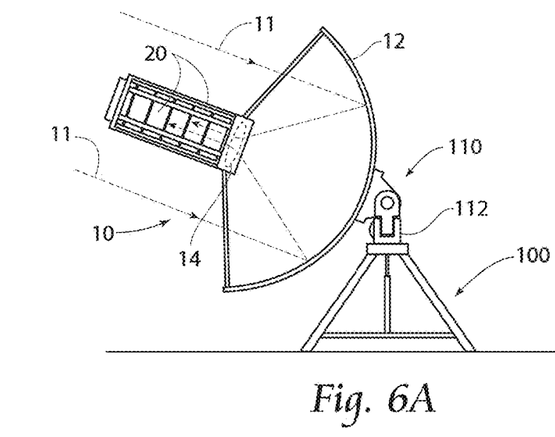
FIG. 6A is an end view of the solar collector apparatus shown in FIG. 1, showing the tracking system positioning the apparatus in a preferred position at or around sunrise.
Figure 6B:
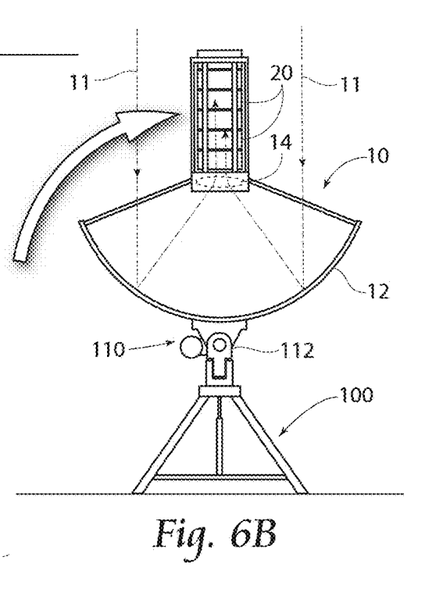
FIG. 6B is an end view of the solar collector apparatus shown in FIG. 1, showing the tracking system positioning the apparatus in a preferred position at or around noon.
Figure 6C:
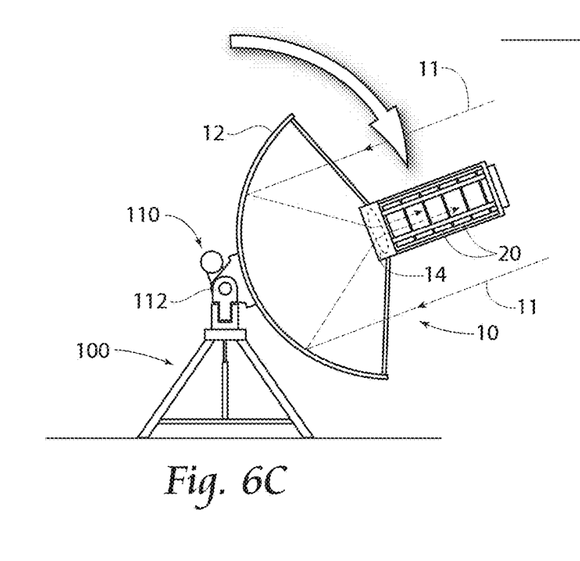
FIG. 6C is an end view of the solar collector apparatus shown in FIG. 1, showing the tracking system positioning the apparatus in a preferred position at or around sunset.

As shown in FIGS. 4 and 5, sun rays 11 are received by the parabolic mirror 10 and directed towards the center axis where the rays are received by and directed through the double convex lens 14. Through the double convex lens 14, the rays 11 are directed from the lens 14, perpendicular to the center axis 15 and all parallel to one another. In this parallel fashion, the rays 11 are all directed to the plurality of secondary mirrors 20 that are aligned along the center axis 15 and extending at approximately a 45 degree angle from the lens 14. This is shown particularly in FIG. 5. As such, the rays 11 that are directed through the lens 14 along the length $L_{Mirror}$ of the parabolic mirror 12 are all received by one of the secondary mirrors 20. The secondary mirrors 20 are positioned so as to direct all of the rays 11 that had been directed through the lens 14 towards a solar collection target 30. It is understood that each of the secondary mirrors 20 may need to be independently positioned in order that all of the solar energy is directed by the secondary mirrors 20 to the same target location. The position of the mirrors 20, including the distance above the lens 14 that they are positioned and/or the angle at which the length of mirrors 20 is positioned over the lens 14, may be dependent upon the location of the solar collection target 30, and can be configured accordingly.

Figure 10:
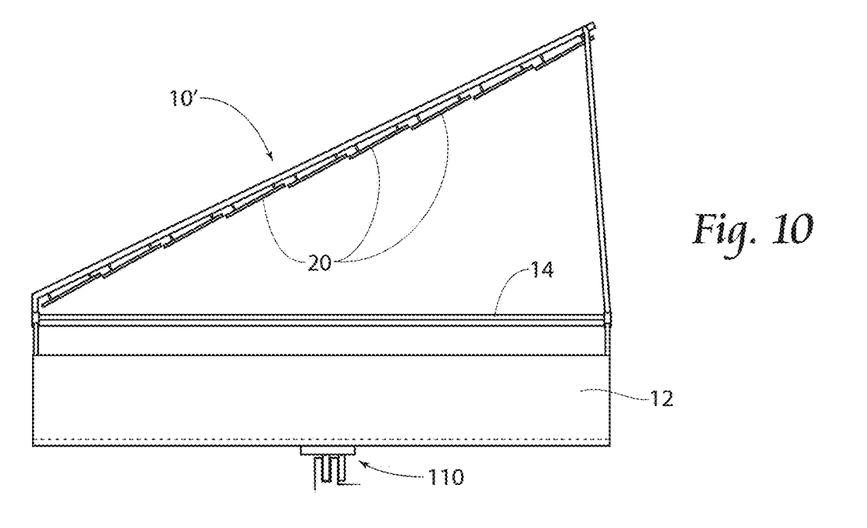
FIG. 10 is a side view of a second embodiment of a solar collector apparatus according to the present invention.
Figure 11:
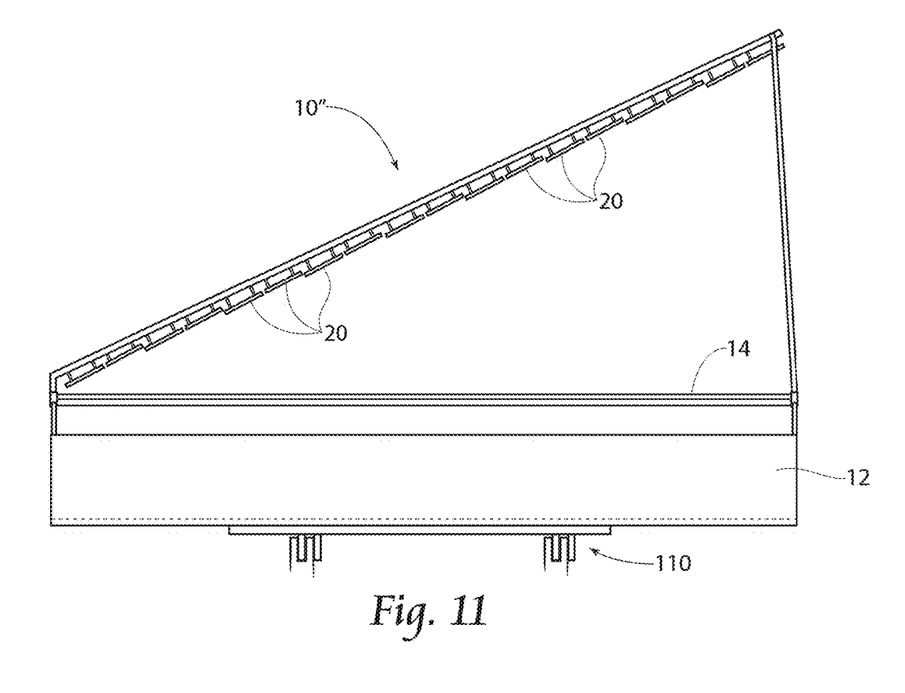
FIG. 11 is a side view of a third embodiment of a solar collector apparatus according to the present invention.

The number of secondary mirrors 20 may be dependent upon the amount of solar energy desired or space available for the solar collector 10, but in a preferred embodiment, the solar collector 10 utilizes twenty secondary mirrors 20. As shown in FIGS. 10-11 various numbers of secondary mirrors 20, such as 9 or 18 as shown, can be used within the scope of the invention. This subsequent diversion by the secondary mirrors 20 allows for far greater collection of solar energy that solar collectors utilizing only a single diversion mechanism.

If the solar collector 10 is constructed having the dimensions as described above, and utilizing twenty secondary mirrors 20, the solar energy collected at the solar collection target 30 is thought to be about 100 times more dense than that of natural sunshine. First, because 5 feet of parabolic mirror 10 (~2.5 feet on each side of the lens 14) is collecting rays 11 and directing the rays 11 to the lens 14, the amount of solar energy passing through the lens 14 is 5 times concentrated as compared to natural sunlight. This 5 times concentrated energy coming from the length $L_{Lens}$ of the lens 14 is collected by the twenty secondary mirrors 20 and then directed towards the solar collection target 30, resulting in solar energy 100 times that of natural sunlight, if the area of the target 30 is approximately the size of a focal area of collected energy, such as about the size of one of the secondary mirrors 20. The density of solar energy collected by the solar collection target 30 for any embodiment of the solar collector 10, in relation to the solar energy of natural sunlight, can be determined by multiplying the approximate width of sunlight captured by parabolic mirror 12 times the number of secondary mirrors 20. In this way, the dimensions and construction of the solar collector 10 can be determined according to the amount of solar energy required.

Figure 12:
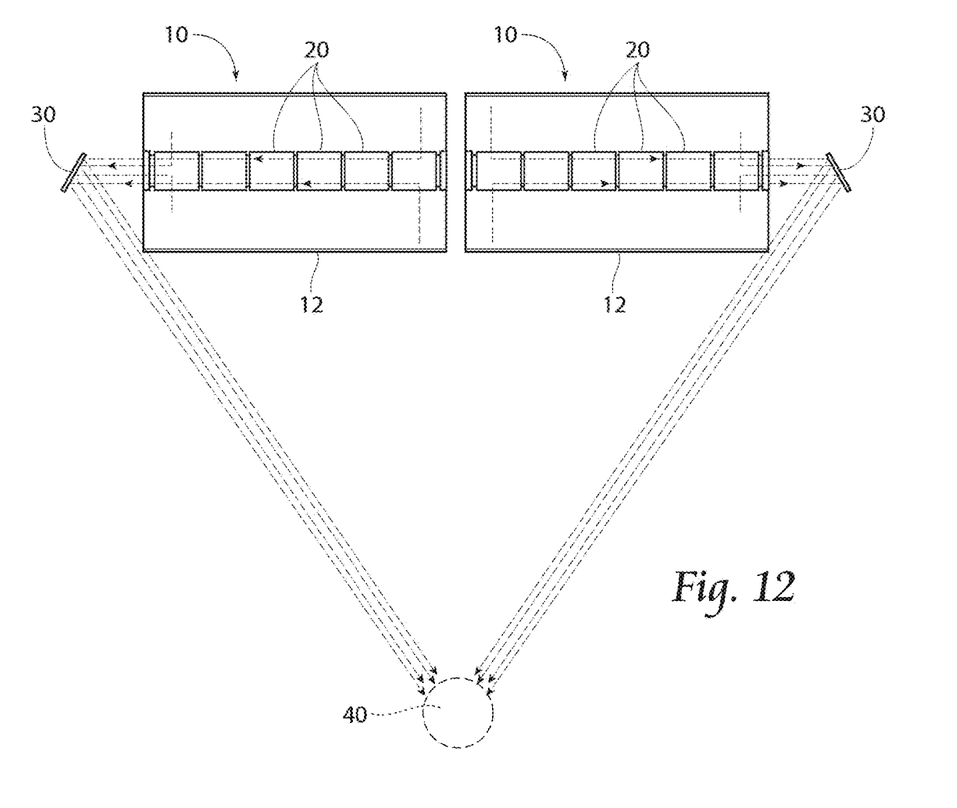
FIG. 12 is a top view of a system utilizing two solar collectors.
Figure 13:
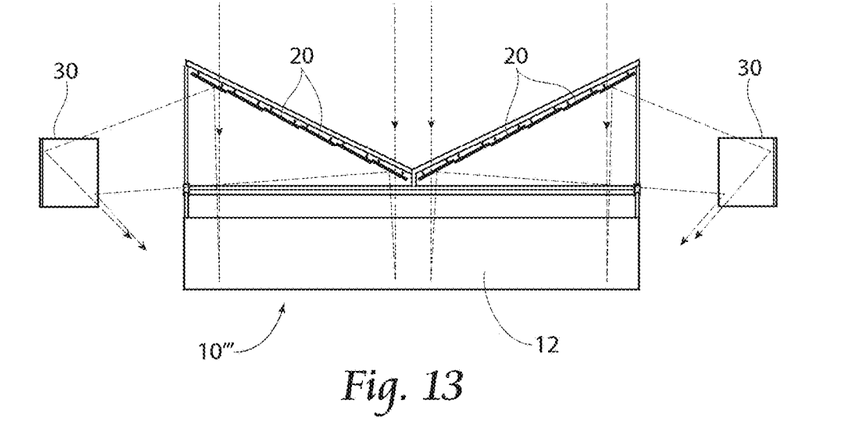
FIG. 13 is a side view of a fourth embodiment of a solar collector apparatus according to the present invention.
Figure 14:
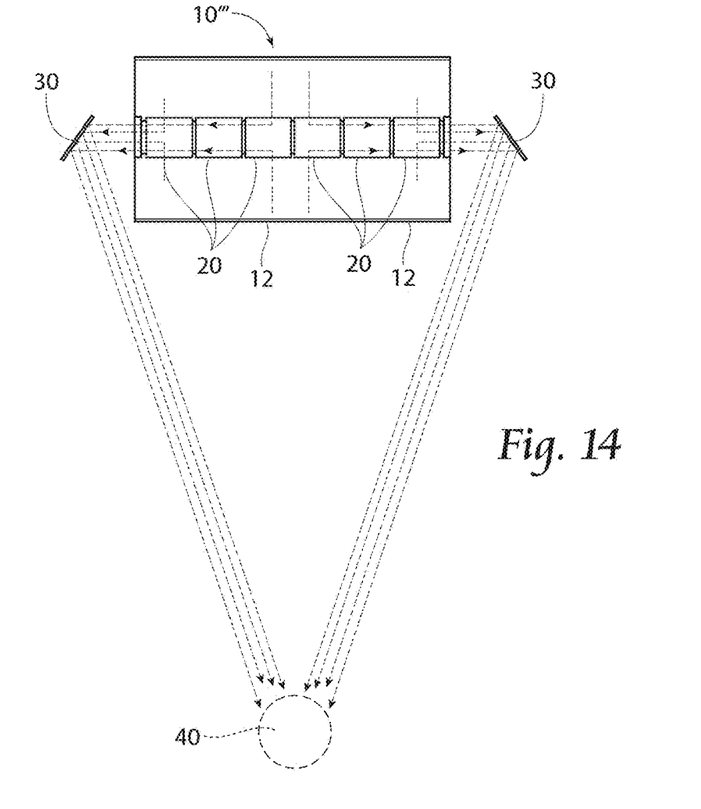
FIG. 14 is a top view of the solar collector apparatus shown in FIG. 13.

Furthermore, as shown in FIGS. 12-14, a plurality of solar collectors 10 could be utilized, each having or directing energy towards a solar collection target 30, with each solar collection target 30 being a mirror (or lens) directed towards a secondary solar collection target 40. In this way, the solar energy collected at a collection target may be further multiplied. FIG. 12 shows two solar collectors 10 in linear alignment with the solar collection targets 30 on the outside, directed to a secondary solar collection target 40. FIGS. 13 and 14 show a single parabolic mirror 10 having two sets of secondary mirrors 20, each set being directed outwardly to a solar collection target 30 which is a mirror directed to a secondary solar collection target 40.

Figure 15:
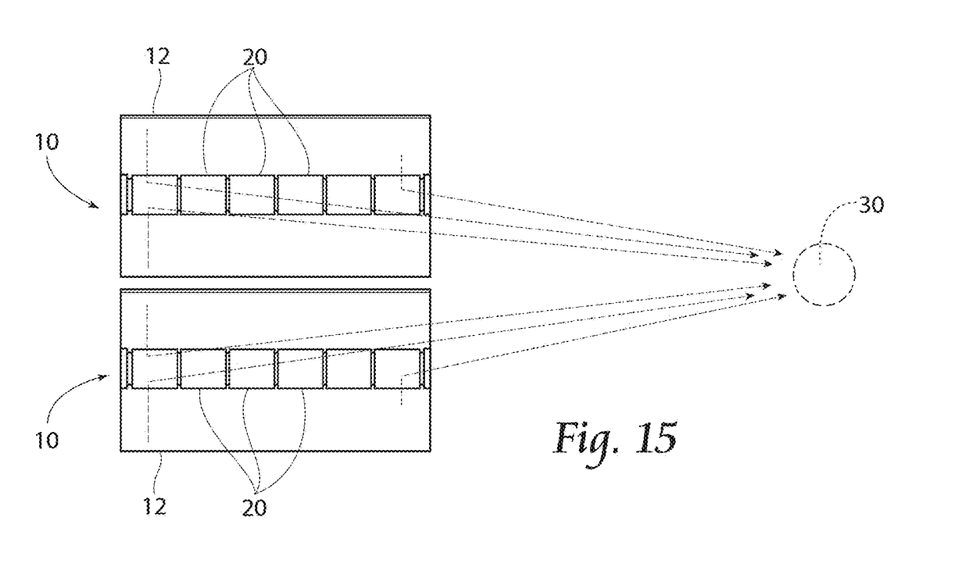
FIG. 15 is a top view of a system utilizing two solar collector apparatus according to the present invention.

FIG. 15 shows an embodiment wherein the solar energy collected at the solar collection target 30 is multiplied further by utilizing a plurality of solar collectors 10 positioned parallel to one another and directed towards a single solar collection target 30. Any of these alternative embodiments may be used to either multiply the amount of solar energy collected, or more efficiently utilize the space available. The embodiments may be combined with one another as necessary to collect the amount of solar energy desired at the solar collection target 30 or 40.

Figure 7A:
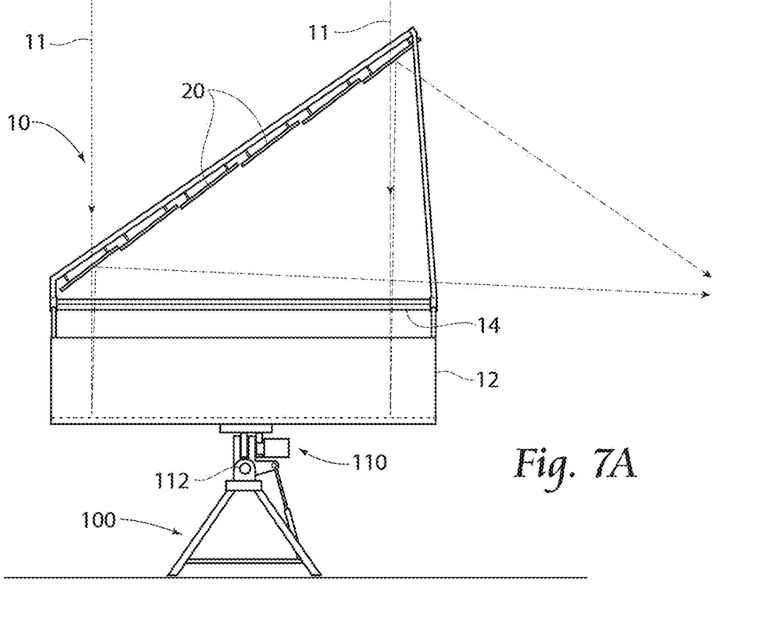
FIG. 7A is a side view of the solar collector apparatus shown in FIG. 1, showing the tracking system positioning the apparatus in a preferred position based on the solar altitude at or around summer solstice.
Figure 7B:
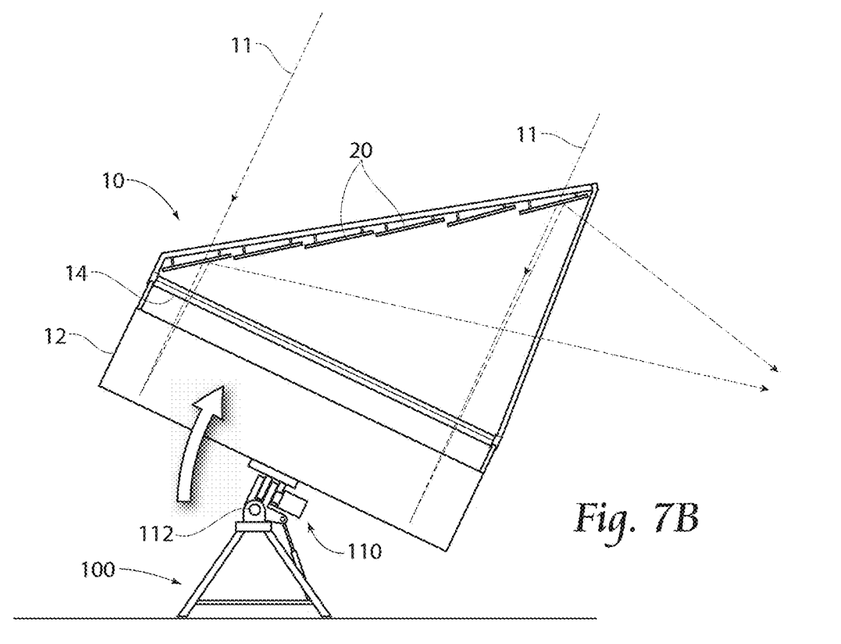
FIG. 7B is a side view of the solar collector apparatus shown in FIG. 1, showing the tracking system positioning the apparatus in a preferred position based on the solar altitude at or around winter solstice.

In order to maximize the solar collecting capabilities of the present invention, the various components of the system, including the parabolic mirror 12, each of the secondary mirrors 20, and/or the solar collection target(s) 30 or 40 are preferably independently movable and/or positionable in order to capture the greatest amount of solar energy. In particular, the parabolic mirror 12 may be moved and repositioned via a tracking system 110, such as a dual axis tracking system 112. By utilizing a dual axis tracking system 112, the solar collector 10 can track both the daily movement of the sun, as depicted in FIGS. 6A-6C and 8A-8B, and the solar altitude of the sun throughout the day or year, as shown in FIGS. 7A-7B. In this way, the parabolic mirror 12 can be positioned such that the sun rays 11 hit the parabolic mirror 12 substantially parallel to the central plane 13 (as shown in FIGS. 6A-6C and 7A-7B) which maximizes the amount of solar energy collected by the solar collector 10.

Figure 8A:
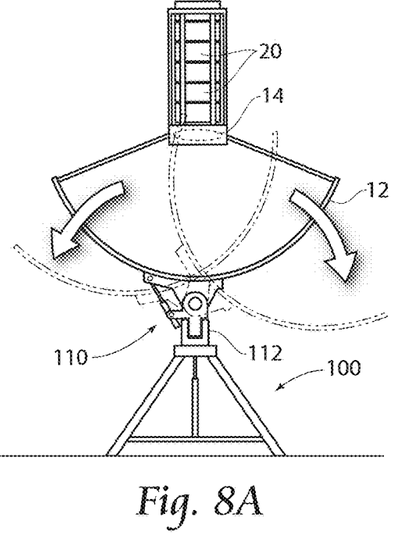
FIG. 8A is an end view of the solar collector apparatus shown in FIG. 1, showing a second embodiment of the tracking system for daily solar tracking.
Figure 8B:
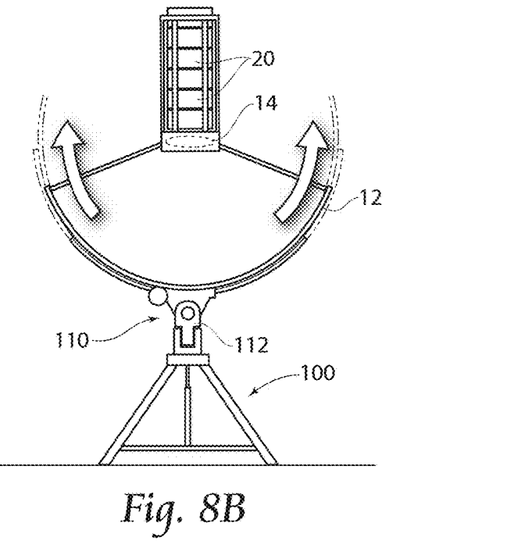
FIG. 8B is an end view of a solar collector apparatus, showing a third embodiment of the tracking system for daily solar tracking.
Figure 9:
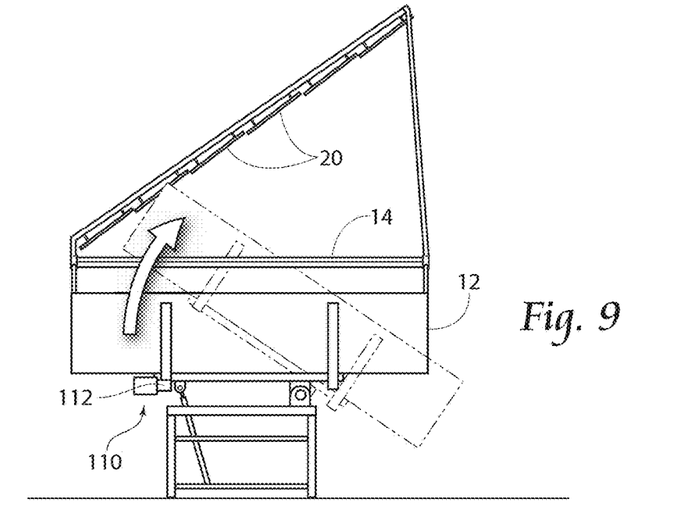
FIG. 9 is a side view of a solar collector apparatus, showing a second embodiment of the tracking system for solar altitude tracking.

The dual axis tracking system 112 may operate through the use of two, perpendicularly configured hinges. One hinge may allow control of the daily movement of the parabolic mirror 12 to follow the solar azimuth and the other hinge may allow control of the movement of the parabolic mirror 12 to follow the solar altitude. The hinges may be manipulated manually, or can be moved (as shown in FIGS. 8A and 9) by actuators (e.g. DC stepper motors) or hydraulics. In another embodiment, the tracking system 112 has a hinge only to control the movement of the parabolic mirror 12 in connection with the solar altitude, while the daily movement (i.e. azimuth) is controlled using a track and motor system (as shown in FIG. 8B) wherein the parabolic mirror 12 moves within and along a parabolic base 114.

As the parabolic mirror 10 is re-positioned throughout the day and/or year, in order to maximize the effectiveness of the system, so too must the secondary mirrors 20 and solar collection target 30 move. For example, in the daily solar tracking embodiment of FIG. 8A, the alignment of the lens 14 and secondary mirrors 20 changes throughout the day. As such, in order for the solar collection target 30 to capture the solar energy from the secondary mirrors 20 it must move to be in alignment with the mirrors 20. In the alternative, the secondary mirrors 20 may be re-positioned to tilt side-to-side (about the axis of the secondary mirrors 20) to reach the solar collection target 30 that is not in direct alignment. In a different fashion, in the embodiment of FIG. 8B, the alignment of the secondary mirrors 20 remains the same throughout the day, so the solar collection target 30 and each secondary mirror 20 can remain in substantially same position.

Furthermore, as the solar altitude changes throughout the year and the parabolic mirror 12 changes position, so too must the secondary mirrors 20 and/or the solar collection target 30 be repositioned in order that the solar collection target 30 captures the solar energy off the mirrors. As can be seen in FIGS. 7A and 7B, as the parabolic mirror 12 tilts to follow the altitude of the sun towards, for example, winter solstice, the secondary mirrors 20 must be titled in an upwards direction along the axis of the mirrors in order to hit the same solar collection target 30, and then back down again as the sun nears summer solstice. Alternatively, the solar collection target 30 may move nearer or farther from the solar collector 10 to account for the movement of the parabolic mirror 12, or a combination of re-positioning both the secondary mirrors 20 and the solar collection target 30.

The plurality of secondary mirrors, similar to the movement of the parabolic mirror 12, can be moved and re-positioned manually, or through the use of actuators or hydraulics. Furthermore, movements of all elements of the solar collector 10 can be directed manually by a user input or user direction, or can be directed by one or more sensors on the system, which are commonly used in art of solar collectors, and which detect where the sun collection is at its greatest and can automatically position the system accordingly.

When the solar energy collected via the solar collector 10 at the solar collection target 30 or 40, the solar energy can be used for any of the mechanisms known in the art, such as to heat something (e.g. to provide hot water to a building or home through a solar water heater), or to generate electricity via a photovoltaic cell, or to catalyze hydrogen production via electrolysis.

The foregoing is considered as illustrative only of the principles of the invention. Furthermore, since numerous modifications and changes will readily occur to those skilled in the art, it is not desired to limit the invention to the exact construction and operation shown and described. For instance, one or more of the secondary mirrors 20 may be paraboloid. Additionally or alternatively, the solar target 30 may be positioned within the length $L_{Mirror}$ of the parabolic mirror 12, or outside thereof as depicted. While the preferred embodiment has been described, the details may be changed without departing from the invention, which is defined by the claims.

I claim:

1. A system comprising:
    a parabolic trough mirror extending longitudinally along and straddling a central plane, said parabolic mirror configured to direct received sunlight towards a focal line contained within said central plane;
    a linear lens positioned along said focal line configured to receive reflected sunlight from said parabolic trough mirror along a length of said focal line; and
    at least one secondary mirror adapted to receive directed sunlight from said lens, said secondary mirror configured to reflect said directed sunlight at a target from a plurality of locations along said focal line.

2. A system according to claim 1, wherein said lens is a double convex lens.

3. A system according to claim 1, wherein said lens is a piano-convex rectangular cylinder lens.

4. A system according to claim 1, wherein said at least one secondary mirror comprises a plurality of secondary mirrors.

5. A system according to claim 4, wherein each of said plurality of secondary mirrors is a planar mirror.

6. A system according to claim 1, wherein each of said at least one secondary mirror is a planar mirror.

7. A system according to claim 1, wherein at least one secondary mirror comprises a paraboloid.

8. A system according to claim 1, wherein said lens is fixedly supported relative to said parabolic mirror.

9. A system according to claim 1, wherein said at least one secondary mirror is selectively stationarily positionable with respect to said parabolic mirror.

10. A system according to claim 9, wherein said lens is fixedly supported relative to said parabolic mirror.

11. A system according to claim 1, further comprising a solar tracking system configured to rotate said parabolic mirror.

12. A method comprising the steps of:
    reflecting sunlight from a parabolic trough mirror towards a linear lens, said parabolic mirror extending longitudinally along and straddling a central plane;
    using said lens, directing said sunlight target from a plurality of locations along said focal line towards a reflective surface having a first reflective area; and
    focusing said sunlight from said reflective surface on a target surface area, wherein said target surface area is smaller than said first reflective area.

13. A method according to claim 12, wherein said reflective surface is a paraboloid.

14. A method according to claim 12, wherein said parabolic mirror has a parabolic cross-section perpendicular to said central plane.

15. A method according to claim 12, wherein said lens is a double convex lens.

16. A method according to claim 12, wherein said lens is a plano-convex rectangular cylinder lens.

17. A method according to claim 12, further comprising a step of rotating said parabolic mirror along a first plane of rotation.

18. A method according to claim 17, further comprising a step of rotating said parabolic mirror along a second plane of rotation.

19. A method according to claim 18, wherein said first plane of rotation is perpendicular to said second plane of rotation.

20. A method according to claim 18, wherein both said step of rotating in said first plane and said step of rotating in said second plane are carried out within a period of 24 hours.

* * * * *